(12) United States Patent
Zhan et al.

(10) Patent No.: US 8,416,584 B2
(45) Date of Patent: Apr. 9, 2013

(54) POWER SUPPLY WITH LOW POWER CONSUMPTION HICCUP STANDBY OPERATION

(75) Inventors: Xiaodong Zhan, Plano, TX (US); David B. Bell, Los Altos Hills, CA (US); Zhixiang Liang, San Ramon, CA (US); Xiangxu Yu, Shenzhen (CN)

(73) Assignee: Intersil Americas Inc., Milpitas, CA (US)

( * ) Notice: Subject to any disclaimer, the term of this patent is extended or adjusted under 35 U.S.C. 154(b) by 561 days.

(21) Appl. No.: 12/788,045

(22) Filed: May 26, 2010

(65) Prior Publication Data

US 2011/0103103 A1 May 5, 2011

Related U.S. Application Data

(60) Provisional application No. 61/256,738, filed on Oct. 30, 2009.

(51) Int. Cl.
*H02M 3/335* (2006.01)
(52) U.S. Cl. .................................................. 363/21.12
(58) Field of Classification Search .... 363/21.04–21.05, 363/21.07–21.08, 21.1, 21.12–21.13, 21.15–21.16, 363/21.18, 78, 81, 84, 89–90, 95, 97, 123–125, 363/127, 131; 323/234, 273–276, 282–285
See application file for complete search history.

(56) References Cited

U.S. PATENT DOCUMENTS

| 2003/0117117 | A1* | 6/2003 | Zinn et al. ..................... 323/273 |
| 2004/0080363 | A1* | 4/2004 | Yabe ............................. 327/546 |
| 2005/0035661 | A1* | 2/2005 | Frank ............................. 307/66 |
| 2007/0279950 | A1* | 12/2007 | Sugiyama et al. ............. 363/59 |
| 2007/0290657 | A1* | 12/2007 | Cretella et al. ................ 323/222 |
| 2009/0316455 | A1* | 12/2009 | Kim et al. ....................... 363/89 |

\* cited by examiner

*Primary Examiner* — Adolf Berhane
*Assistant Examiner* — Jeffrey Gblende
(74) *Attorney, Agent, or Firm* — Gary Stanford

(57) ABSTRACT

A power supply including a converter, a capacitance, and a hiccup control module. The converter converts an input voltage to both an output voltage and a preliminary standby voltage when in its active state. The capacitance stores the preliminary standby voltage which is charged to an upper voltage level when the converter is in its active state and which is discharged to a lower voltage level when the converter is in its inactive state. During the standby mode, the hiccup control module operates the converter in hiccup mode by toggling between placing the converter into its inactive state when the preliminary standby voltage is charged to the upper voltage level and placing the converter into its active state when the preliminary standby voltage is discharged to the lower voltage level. The hiccup mode of the power supply eliminates a need for a separate standby converter.

21 Claims, 4 Drawing Sheets

POWER SUPPLY WITH LOW POWER CONSUMPTION HICCUP STANDBY OPERATION

CROSS-REFERENCE TO RELATED APPLICATIONS

This application claims the benefit of U.S. Provisional Application Ser. No. 61/256,738, filed on Oct. 30, 2009, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. Terms such as "module" and "system" and the like are intended to encompass the devices, components, circuits, software, firmware, etc., which are configured to implement the corresponding module or system and the like.

Figure 1:
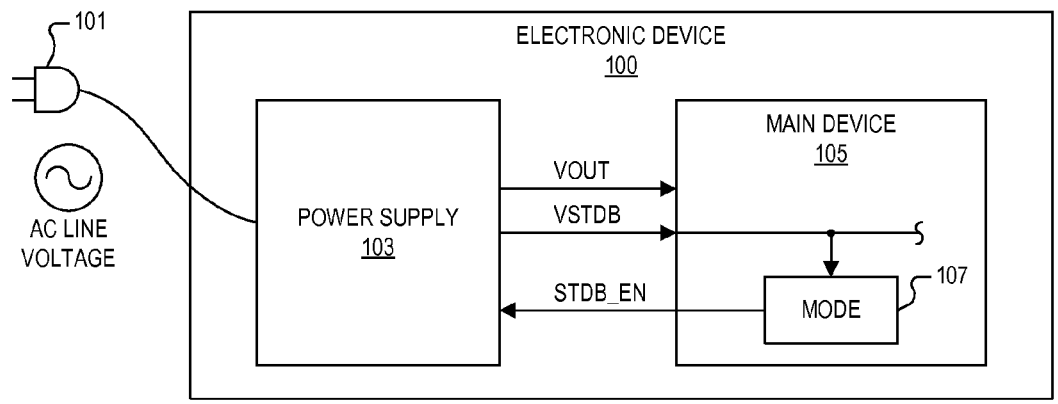
FIG. 1 is a simplified block diagram of an electronic device including a power supply with low power consumption hiccup standby operation according to one embodiment.

FIG. 1 is a simplified block diagram of an electronic device 100 including a power supply 103 with low power consumption hiccup standby operation according to one embodiment. The electronic device 100 includes the power supply 103 with an alternating current (AC) plug 101 or the like and main device system 105. The AC plug 101 is configured to plug into an AC outlet for receiving AC line voltage and for providing the AC line voltage to an input of the power supply 103. The power supply 103 converts the AC line voltage to a DC output voltage VOUT used to provide source voltage to the main device system 105 during a normal operating mode. The power supply 103 further provides a standby voltage VSTDB for a standby operating mode as described herein. The main device system 105 is configured according to the particular type of electronic device, and includes any combination of devices, circuits, components, software, firmware, systems, etc., configured for implementing the functions of the electronic device. The main device system 105 has multiple operating modes including a normal or full power operating mode and a reduced power standby mode. During the normal operating mode, both VOUT and VSTDB are provided. During the standby mode, the primary DC output voltage VOUT is not provided while the standby voltage VSTDB remains operative to provide power to a standby system within the main device system 105. The standby system includes a mode control module 107 which receives VSTDB so that it remains operative during the normal and standby modes.

The electronic device 100 may be placed in standby mode according to any one of many different methods, such as user input or control (e.g., pressing power button), inactivity timers, completion of current operations, programmed timer, completion of one or more operating conditions, etc. During normal operation, the mode control module 107 detects or otherwise determines that standby mode is desired and asserts a standby enable (STDB_EN) signal, which is provided to an input of the power supply 103. The power supply 103 receives the STDB_EN signal and enters the standby mode in which VOUT is removed. The power supply 103, however, continues to provide the VSTDB voltage to the mode control module 107 of the main device system 105 in the event the electronic device 100 transitions back into the normal operating mode. The electronic device 100 may be transitioned back into the normal operating mode according to any one of many different methods in a similar manner as for transitioning to standby operation, such as user input or control (e.g., pressing power button), timer events, programmed timer, detection of operating mode parameters, etc.

The electronic device 100 is one of any type of consumer, commercial, or industrial devices or products, such as, for example, appliances (e.g., refrigerators, microwaves, dishwashers, washers, dryers, ovens coffee makers, etc.), computer and office automation systems (e.g., desktops, monitors, notebooks, external disk drives, printers, facsimile machines, etc.), audio/video (A/V) products (e.g., televisions, stereo systems, iPod docking stations, media players, etc.), communication devices (e.g., set-top boxes, cable modems, wired/wireless access/communication devices, etc.), industrial control systems, medical devices and machines, etc. This list of products is not intended to be exhaustive such that any type of consumer, commercial or industrial electronic device is contemplated. The electronic system incorporated within the electronic device 100 includes the appropriate electronic devices and/or subsystems, components, circuits, etc., such as any combination of any one or more of memory devices, controllers, microprocessors, coprocessor, etc.

According to recent world-wide energy savings programs, such as Energy Star, European Union Low Power Directive (EC-1275-2008), etc., standby power consumption is required to be less than 1 Watt (<1 W) for units shipped after December 2009, to be further reduced to <0.5 W in a short time thereafter. Conventional power supplies have several deficiencies and inefficiencies. Conventional power supplies include a separate standby converter in addition to the main converter. The inclusion of a separate standby converter increases power supply complexity and cost. Conventional power supplies also typically consume more than 1 Watt (>1 W) during standby mode and thus do not meet the recent energy standards. The power supply 103 is configured with low power consumption hiccup standby operation. During the standby mode, the main converter of the power supply 103 operates in hiccup standby mode to maintain the VSTDB voltage, thereby eliminating the additional standby converter. Furthermore, the power supply 103 consumes less than 0.5 W in standby mode, thereby meeting the recent energy standards. In one embodiment, the power consumption of the electronic device 100 is reduced to less than 0.4 W, which meets the maximum power threshold of the standards (e.g., 0.4 W<0.5 W).

The power supply 103 further meets various safety requirements. For example, safety requirements dictate that any residual charge or the like stored at the input of the power supply 103 be quickly discharged upon removal of the AC line voltage. For example, when the AC plug 101 is pulled out, any such residual charge in the power supply 103 must be discharged within one second to meet the safety requirements. It is noted that conventional configurations employ input resistors for the discharge function, where such input resistors consume substantial power during normal operation and would otherwise increase power consumption during the standby mode. Such resistors are eliminated to improve efficiency and to minimize standby power consumption, so that the power supply meets both the recent energy standards and the requisite safety standards.

Figure 2:
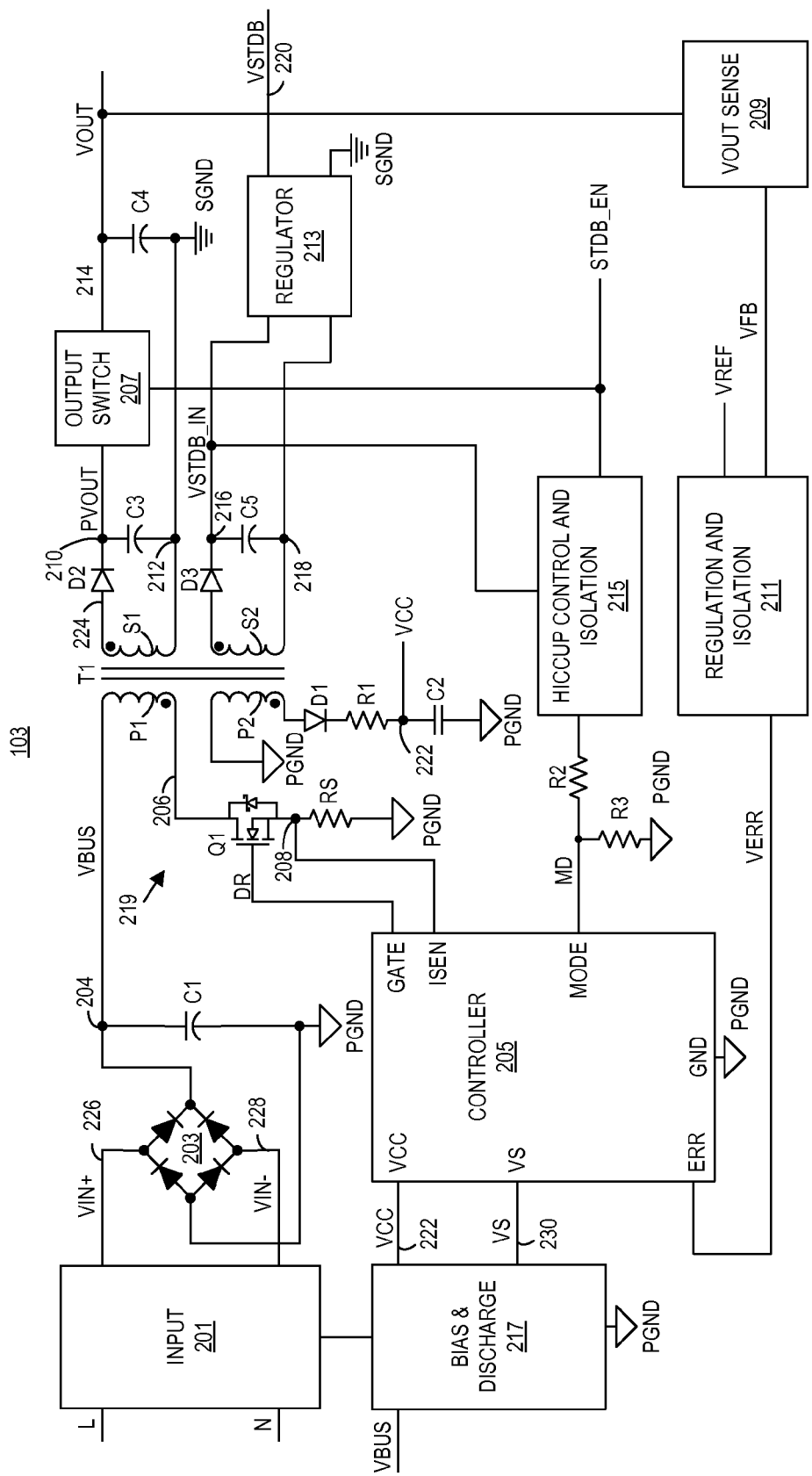
FIG. 2 is a simplified schematic and block diagram of the power supply of FIG. 1 implemented according to one embodiment.

FIG. 2 is a simplified schematic and block diagram of the power supply 103 implemented according to one embodiment. The AC line voltage is provided as an AC differential input which includes line (L) and neutral (N) signals which are provided to respective inputs of an input module 201. The AC line voltage is either low-line at about 120 Volts (V) AC or high-line at about 220-240 V AC. The input module 201 includes various components and devices for conditioning the AC line voltage, such as input fuses (not shown), an electromagnetic interference (EMI) filter, and differential input capacitors CA, CB, CC (FIG. 7) as further described below. The input module 201 has a pair of outputs coupled to nodes 226 and 228 providing corresponding VIN+ and VIN− (VIN+/−) input voltage polarity signals, respectively, which are provided to a pair of inputs of a full-wave rectifier 203. A negative output of the full-wave rectifier 203 is coupled to a primary ground (PGND) node and a positive output of the full-wave rectifier 203 is coupled to a node 204 which develops a rectified DC voltage VBUS. A filter capacitor C1 is coupled between node 204 and PGND for filtering VBUS. The input module 201, the full-wave rectifier 203 and the capacitor C1 collectively form an AC/DC converter for converting the AC line voltage to VBUS. VBUS is provided to one end of a first primary winding P1 of a transformer T1, and the other end of the primary winding P1 is coupled to a node 206 which is further coupled to a first current terminal of an electronic switch Q1. The other current terminal of switch Q1 is coupled to one end of a current sense resistor RS at a current sense node 208, in which RS has its other end coupled to PGND. Q1 has a control terminal which receives a drive signal DR provided from the GATE output of a controller 205. The current sense node 208 develops a voltage indicative of current through the first primary winding P1, in which node 208 is coupled to a current sense (ISEN) input/output (I/O) terminal of the controller 205.

Although Q1 is shown as an N-channel metal-oxide semiconductor, field-effect transistor (MOSFET) MOSFET, it is understood that other types of electronic switches may be used to implement the switch Q1, such as other type of MOS devices or FET devices, similar devices with different polarities such as P-channel devices and the like, or different types of transistor devices such as bipolar junction transistors (BJTs) and the like. Thus, Q1 is generally referred to as a switch having current terminals (e.g., drain-source) and a control terminal (e.g., gate). The switch Q1 is illustrated as a single MOSFET device, but may be implemented as multiple switch devices, e.g., coupled in parallel to reduce switch resistance, improve efficiency and reduce power consumption, or coupled in series (e.g., cascode devices) to increase breakdown voltage, or Darlington configurations, etc., as understood by those skilled in the art. The controller 205 may be implemented in any suitable manner or by any suitable device, such as, for example, the ISL6721 single-ended current mode PWM controller available from Intersil Corporation of Milpitas, Calif. Although not shown, a gate drive system or the like may be provided between the GATE output of the controller 205 and the control terminal of switch Q1 for generating the gate drive signal DR.

The transformer T1 has a second primary winding P2 having a first terminal coupled to PGND and a second terminal coupled to the anode of a diode D1. It is noted that the windings of T1 are shown as the same size for simplicity, where it is understood that the different windings usually have a different number of turns so that their relative sizes vary based on applicable design criteria. The cathode of diode D1 is coupled to one end of a resistor R1, having its other end coupled to a node 222 developing a supply voltage VCC. Node 222 is coupled to one end of a capacitor C2, having its other end coupled to PGND. VCC is provided to a voltage supply terminal of the controller 205, which has a reference terminal (GND) coupled to PGND. The transformer T1 has a first secondary winding S1 having a first terminal coupled to a node 224 which is coupled to the anode of a diode D2 and a second terminal coupled to a node 212. The cathode of D2 is coupled to a node 210 developing a preliminary output voltage PVOUT, and a capacitor D3 is coupled between nodes 210 and 212 for filtering PVOUT. In the simplified diagram, node 212 is shown coupled to a secondary ground (SGND). In some embodiments, however, a small output current sense resistor RIS (FIG. 6) is coupled between node 212 and SGND. Node 210 is coupled to an input terminal of an output switch system 207. The output switch system 207 has an output terminal coupled to an output node 214 developing output voltage VOUT relative to SGND. An output capacitor C4 is coupled between VOUT and SGND to filter the output voltage VOUT. VOUT is provided to an input of an output voltage sense module 209, which has an output providing an output voltage feedback signal VFB to an input of a regulation and isolation module 211. The regulation and isolation module 211 has another input receiving a voltage reference signal VREF, and has an output providing an error voltage VERR to an error input ERR of the controller 205.

The transformer T1 has a second secondary winding S2 having a first terminal coupled to the anode of a diode D3 and a second terminal coupled to a node 218. The cathode of D3 is coupled to a node 216 which develops an input standby voltage VSTDB_IN. A capacitor C5 is coupled between nodes 216 and 218 to filter VSTDB_IN and to store energy to hold VSTDB_IN high during an inactive state for hiccup mode of operation as further described herein. Nodes 216 and 218 are coupled to respective inputs of a low dropout (LDO) voltage regulator 213, having a first output coupled to a node 220 developing the VSTDB voltage relative to a reference output which is coupled to SGND. VSTDB_IN is provided to an input of a hiccup control and isolation module 215. The STDB_EN signal is provided to another input of the output switch system 207 and to an input of the hiccup control and isolation module 215. The hiccup control and isolation module 215 has an output coupled to one end of a resistor R2, which has another end developing a mode signal MD which is provided to one end of a pull-down resistor R3 and to a MODE input of the controller 205. The other end of R3 is coupled to PGND. The input module 201 is further coupled to a bias and discharge system 217, which has another input receiving VBUS, a first output coupled to node 222 providing VCC, and a second output coupled to node 230 providing a voltage sense signal VS to a VS sense input of the controller 205.

The transformer T1 of the power supply 103 has primary and secondary windings as described herein and thus provides isolation between the AC line voltage at the input and the main device system 105 at the output to meet applicable safety standards as understood by those skilled in the art. The regulation and isolation module 211 and the hiccup control and isolation module 215 are both implemented with isolation devices, such as optical couplers and the like, for maintaining the desired isolation. The MODE input determines the operating mode of the controller 205 as controlled by the hiccup control and isolation module 215, which is further controlled by the STDB_EN signal. In one embodiment, the MODE input is pulled high to place the controller 205 in a sleep mode and is pulled to a lower voltage level to wake up the controller 205 to resume normal operation. In one embodiment, the STDB_EN signal is pulled high for normal operation and is pulled low to put the power supply 103 in standby mode. As described herein, the particular controller 205 has a sleep mode in which it is inactive, and an awake mode in which it is active. Alternative embodiments are contemplated using a controller or control circuitry or control module or the like which may or may not have a sleep mode, but nonetheless switches between active and inactive states. Thus, the controller 205 is also said to be active (e.g., awake mode or the like) or inactive (e.g., sleep mode or the like).

In normal operation of the power supply 103, when the AC plug 101 is plugged in to receive AC line voltage, the input module 201 develops corresponding AC voltage on VIN+/− provided to the inputs of the full-wave rectifier 203. The full-wave rectifier 203 and the capacitor C1 convert the AC input voltage to the rectified DC voltage VBUS. As further described below, the AC line voltage and VBUS are both provided to the bias and discharge system 217 which initially develops a voltage of VCC which is a supply voltage for the controller 205. The MODE input of the controller 205 is pulled low by resistor R3 so that the controller 205 is awake for normal operation. The controller 205 senses the voltage level of the VCC and VS voltages and initiates normal operation when these voltages have reached corresponding minimum voltage levels. The controller 205 begins operating and controlling the switch Q1 to initiate conversion of VBUS to PVOUT and VSTDB_IN. In the illustrated embodiment, the controller 205, the switch Q1, the transformer T1, the output devices, e.g., including D2, D3, C3 and C5 as well as any other supporting devices or circuitry or the like (not shown), are collectively configured as a flyback converter 219. Although a particular flyback converter is shown, the present invention is not limited to the particular type of converter and applies equally to other types of converters (e.g., buck, boost, buck-boost, push-pull, etc.) and to different types of flyback converters (e.g., dual switch flyback converters and the like). The controller 205 turns on the switch Q1 causing primary current flow through the primary winding P1 of the transformer T1 thereby storing energy in the transformer T1. When the controller 205 turns off the switch Q1, the energy stored in the transformer T1 is transferred to the primary winding P2 and the secondary windings S1 and S2 forward biasing the diodes D1, D2 and D3 and charging the capacitors C2, C3 and C5.

The capacitor C3 charges PVOUT to its operative level and the capacitor C5 charges VSTDB_IN to its upper voltage level, referred to herein as "HI." As flyback converter operation is initiated, the current through the second primary winding P2 provides current through the diode D1 and the resistor R1 to the capacitor C2 to charge the VCC supply voltage to its normal operating voltage level. As further described below, the normal operating voltage level of VCC is higher than that developed by the start-up regulator of the module 217, so that the start-up regulator of module 217 is turned off to minimize power loss during normal and standby modes. In this manner, the bias and discharge system 217 develops an initial lower voltage level of VCC sufficient for powering up the controller 205, and the devices of the second primary winding P2 increase VCC to turn off the start-up regulator within the bias and discharge system 217 to maximize power efficiency.

The voltage regulator 213 converts the VSTDB_IN voltage to the VSTDB voltage, so that VSTDB is a steady and regulated version of the preliminary standby voltage VSTDB_IN. When the STDB_EN signal is eventually asserted high indicating normal operation, the power switch 207 is turned on so that PVOUT is provided as the output voltage VOUT to the main device system 105. VOUT is sensed through the VOUT sense module 209, which provides VFB to the regulation and isolation module 211. The regulation and isolation module 211 compares VFB with the reference voltage VREF to develop the error voltage VERR provided to the ERR input of the controller 205. The controller 205 controls switching operation of Q1 based on VERR according to PWM operation to maintain VOUT at a target voltage level. In this manner, the voltage level of VOUT is regulated to a desired level during normal operation.

Figure 3:
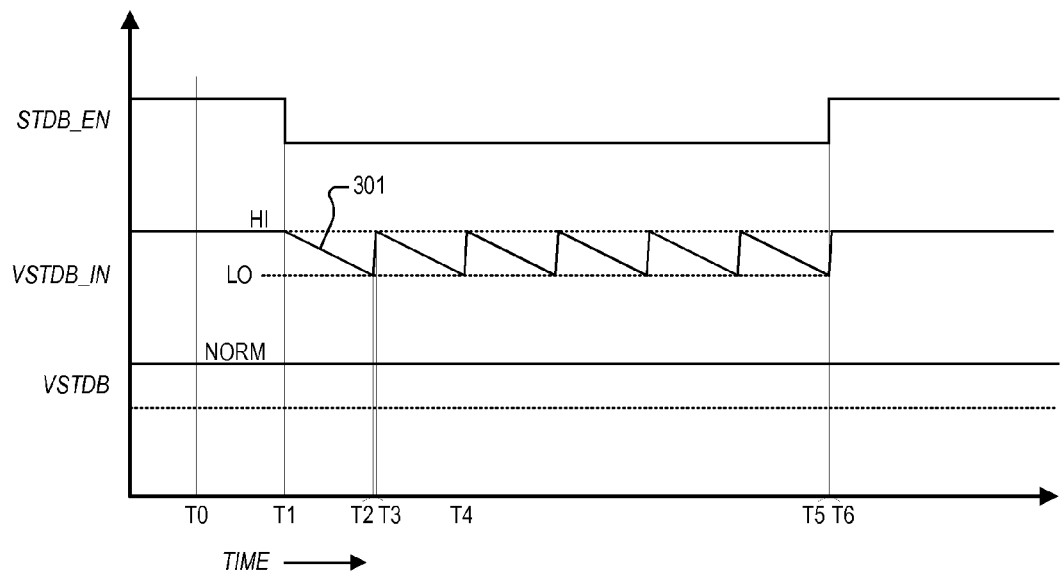
FIG. 3 is a graphic diagram plotting the voltages of STDB_EN, VSTDB_IN, and VSTDB versus time illustrating transition from normal operating mode to standby mode and back to normal operation of the power supply of FIG. 2.

FIG. 3 is a graphic diagram plotting the voltages of STDB_EN, VSTDB_IN, and VSTDB versus time illustrating transition from normal operating mode to standby mode and back to normal operation of the power supply 103. At an initial time T0, the STDB_EN is asserted high indicating normal operation. At time T0, the VSTDB_IN voltage is at its upper voltage level HI and VSTDB is at its normal operating voltage NORM. When the mode control module 107 detects that the electronic device 100 is to be placed in standby mode, it asserts STDB_EN low, such as shown at time T1, to disable the output switch system 207 and to initiate hiccup standby operation. The hiccup control and isolation module 215 detects STDB_EN asserted low and pulls MD high thus pulling the MODE input of the controller 205 high. The controller 205 transitions to sleep mode and stops controlling the switch Q1 so that operation of the converter 219 is temporarily suspended. Thus, the converter 219 has an active state during normal operation when the controller 205 is awake, and the converter 219 has an inactive state when the controller is in its sleep mode.

The second secondary winding S2 stops providing voltage when the converter 219 is inactive and the capacitor C5 begins discharging. Nonetheless, the capacitor C5 maintains the voltage of VSTDB_IN above its lower voltage level, referred to herein as "LO", for a relatively long time period. The size of the capacitor C5 is selected based on the current draw of the voltage regulator 213 and the desired the duration of the time period of the discharge from HI to LO. In one embodiment, the rate of discharge is selected for a discharge period of about 300 milliseconds (ms). During the discharge period, the voltage of VSTDB_IN decays through the voltage regulator 213 as shown at 301. Nonetheless, the voltage regulator 213 regulates the voltage of VSTDB so that it remains steady at its NORM level. When the preliminary standby voltage VSTDB_IN eventually falls to its lower voltage level LO at a subsequent time T2 after the discharge time, the MODE input of the controller 205 is pulled low and the controller 205 is pulled out of its sleep mode back into its awake mode. When awakened, the controller 205 begins controlling the switch Q1 and the converter 219 becomes active. The secondary winding S2 quickly develops voltage and VSTDB_IN is relatively quickly recharged back to its upper voltage level at time T3. In one embodiment, VSTDB_IN is recharged back to its upper voltage level in a relatively short time period, such as about 5-10 ms.

Once recharged, the MODE input of the controller 205 is once again pulled high so that the controller 205 is again pulled back to sleep mode for the discharge time period in the same manner as described above, and the converter 219 goes inactive. Thus, the voltage of VSTDB_IN once again discharges from its upper voltage level HI beginning at time T3 to its lower voltage level LO at time T4 after the time period. Operation repeats or toggles in this manner such that VSTDB_IN develops a sawtooth type waveform in which it quickly charges back to its upper voltage level HI in the short time period, then ramps down to its lower voltage level LO, and repeats in this manner during the standby mode of operation. It is appreciated that the hiccup control and isolation module 215 operates the converter 219 in hiccup mode in which it is toggled between active and inactive states by toggling the controller 205 between sleep and awake modes as illustrated by the sawtooth waveform developed by VSTDB_IN during the standby mode of the power supply 103. In spite of the sawtooth waveform develop by VSTDB_IN, the voltage converter 213 maintains VSTDB at its regulated NORM level.

At subsequent time T5, the STDB_EN signal is once again asserted high indicating that the electronic device 100 is to be transitioned back to normal operating mode. The hiccup control and isolation module 215 effectively isolates VSTDB_IN and no longer pulls MD high so that the resistor R3 pulls MD low. The controller 205 is awakened or otherwise remains awake and the converter 219 goes active or otherwise stays active so that flyback converter operation resumes. Thus at about time T6, the voltage of VSTDB_IN goes back to its upper voltage level HI and remains at the HI level during normal operation. The voltage of VSTDB remains steady at its NORM level during normal operating mode and throughout standby mode of the electronic device 100.

The voltage of the LO level of the VSTDB_IN voltage is sufficiently high so that the voltage regulator 213 maintains the voltage of VSTDB at a constant level during normal operating mode and during standby mode. In one embodiment, for example, the voltage of VSTDB_IN ranges from its HI level of about 9V to its LO level of about 4.5V while VSTDB remains steady at about 3.3V. In a more efficient embodiment as further described below, the voltage of VSTDB_IN ranges from its HI level of about 5.7V to its LO level of about 4.5V while VSTDB remains steady at about 3.3V. In either case, the voltage of VSTDB remains steady at its NORM level to provide sufficient operating voltage to the mode control module 107 to detect the desired operating mode.

Figure 4:
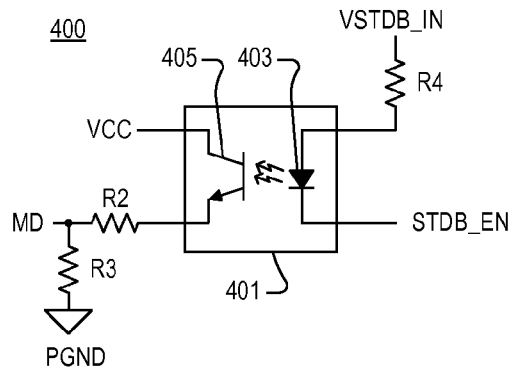
FIG. 4 is a schematic diagram of one embodiment of the hiccup control and isolation module of FIG. 2.

FIG. 4 is a schematic diagram of one embodiment of the hiccup control and isolation module 215, shown as hiccup control and isolation module 400. The hiccup control and isolation module 400 includes an optical coupler 401 and a resistor R4. VSTDB_IN is provided to one end of the resistor R4, having its other end coupled to a first input of the optical coupler 401, in which the first input is internally coupled to the anode of an internal light-emitting diode (LED) 403. The cathode of LED 403 is internally coupled to a second input of the optical coupler 401, which receives the STDB_EN voltage signal. The optical coupler 401 includes an internal NPN bipolar junction transistor (BJT) 405 having a collector forming a first output and an emitter forming a second output of the optical coupler 401. VCC is coupled to the first output of the optical coupler 401 and thus to the collector of transistor 405. The emitter of the transistor 405 forms the second output which is coupled to the resistor R2, having its other end developing the MD signal.

In operation, when STDB_EN is high, the LED 403 remains off so that the transistor 405 remains off. The resistor R3 pulls MD down so that the MODE input of the controller 205 is low indicating normal operation. When STDB_EN is pulled low for standby operation, current flows from VSTDB_IN through resistor R4 turning on the LED 403, which turns on the transistor 405. When the transistor 405 is turned on, it applies VCC to the voltage divider of R2 and R3 pulling MODE high forcing the controller 205 into sleep mode. As previously described, when the controller 205 goes into sleep mode, the converter 219 goes inactive and VSTDB_IN decreases thereby reducing current through the LED 403 and reducing current through the transistor 405. When VSTDB_IN reaches its lower voltage level LO, the transistor 405 is turned off or otherwise the voltage of MD reaches the threshold level of MODE pulling the controller 205 out of sleep mode back into its awake mode. The controller 205 begins controlling the switch Q1 so that VSTDB_IN is pulled back high to its upper lower voltage level HI as previously described. The higher voltage level of VSTDB_IN re-energizes the optical coupler 401 so that MD is pulled high once again to force the controller 205 back into sleep mode. Operation repeats in this manner for hiccup standby mode while STDB_EN remains low. When STDB_EN is pulled back high to resume normal operation, the optical coupler 401 is turned off, MD is pulled back low and the controller 205 is awakened to resume its normal operating mode.

The voltage regulator 213 has a dropout voltage DV such that the lower voltage level of VSTDB_IN is LO=DV+VSTDB to ensure regulation of VSTDB. The optical coupler 401 has a current transfer ratio (CTR) metric representing the ratio of output current to input current. In one embodiment, the CTR of the optical coupler 401 has a relatively wide tolerance level (e.g., ranging from 150% to 300%), which means that the upper voltage level HI of VSTDB_IN may be twice the level of the lower voltage level LO. Thus VSTDB_IN has a relatively large voltage range from LO to 2 times LO or more. Although optical couplers may be designed with a lower CTR tolerance, this significantly increases cost of the system. In one embodiment, VSTDB is regulated at approximately 3.3V, DV is 1.2V so that the LO voltage level of VSTDB_IN is approximately 4.5V. Thus the upper voltage level HI is greater than 9V so that the dropout voltage across the voltage regulator 213 is relatively high or greater than 5.7V. The relatively high value of VSTDB_IN results in relatively high power loss associated with the voltage regulator 213. It is desired to reduce the voltage range of VSTDB_IN.

Figure 5:
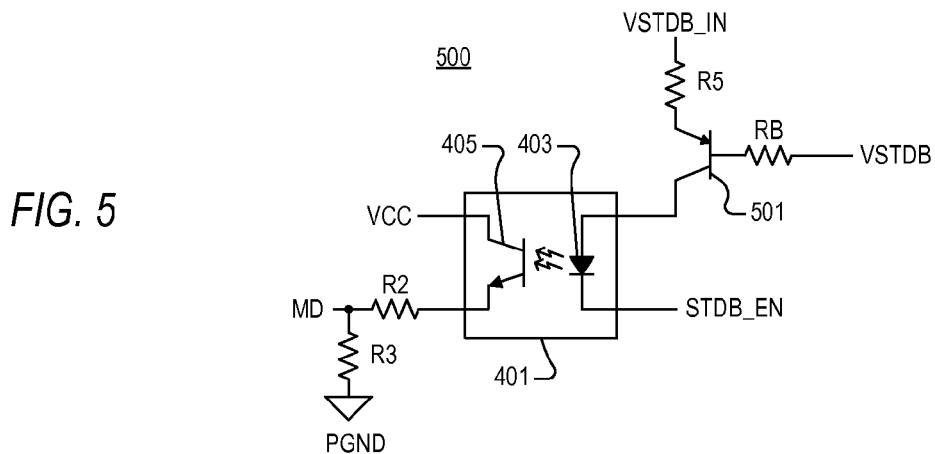
FIG. 5 is a schematic diagram of another embodiment of the hiccup control and isolation module of FIG. 2.

FIG. 5 is a schematic diagram of another embodiment of the hiccup control and isolation module 215, shown as hiccup control and isolation module 500. The hiccup control and isolation module 500 includes the optical coupler 401, a PNP BJT 501 and two resistors RB and R5. In this case, VSTDB_IN is provided to one end of the resistor R5, having its other end coupled to the emitter of transistor 501. The base of transistor 501 is coupled to one end of RB, having its other end receiving the voltage VSTDB. The collector of transistor 501 is coupled to the first input of the optical coupler 401 and thus to the anode of LED 403. STDB_IN is provided to the second input of the optical coupler 401 and thus to the cathode of LED 403. The output of the optical coupler 401 formed by the transistor 405 is coupled in substantially the same manner as for the hiccup control and isolation module 400.

Operation of the hiccup control and isolation module 500 is similar to the hiccup control and isolation module 400, except that the voltage range of the VSTDB_IN during hiccup standby mode is substantially reduced and not determined by the relatively wide tolerance level of the CTR of the optical coupler 401. The activation and deactivation trigger points of the hiccup control and isolation module 500 is based on the operating parameters of the transistor 501 rather than the CTR of the optical coupler 401. When STDB_EN is high, there is no current through LED 403 so that the converter 219 remains active for the normal operating mode. It is noted that transistor 501 may remain on because of the relatively high dropout voltage of the voltage regulator 213. When STDB_EN is pulled low, since the transistor 501 is on or otherwise turned on, current flows through the LED 403 turning on the transistor 405 pulling the controller 205 into sleep mode and the converter into its inactive state. As the voltage of VSTDB_IN decreases towards the voltage of VSTDB, the transistor 501 turns off and the controller 205 is awakened, thereby establishing the repetitive cycle for hiccup standby mode. In this case, the trigger point is determined by the base-to-emitter PN junction voltage drop of the transistor 501 and the voltage drops across the resistors RB and R5. The resistance of the resistor R5 is significantly smaller than the resistance of the resistor R4 (e.g., ~10KΩ for R4 versus ~100Ω for R5), so that the voltage drop across R5 is significantly reduced. In this manner, the upper voltage level HI of VSTDB_IN is significantly reduced and much closer in value to the lower voltage level LO. In one embodiment, the upper voltage level HI is about 6V, so that VSTDB_IN ranges between about 4.5V to 6V. Thus, the power loss of the voltage regulator 213 during normal operation and during standby mode is substantially reduced.

Figure 6:
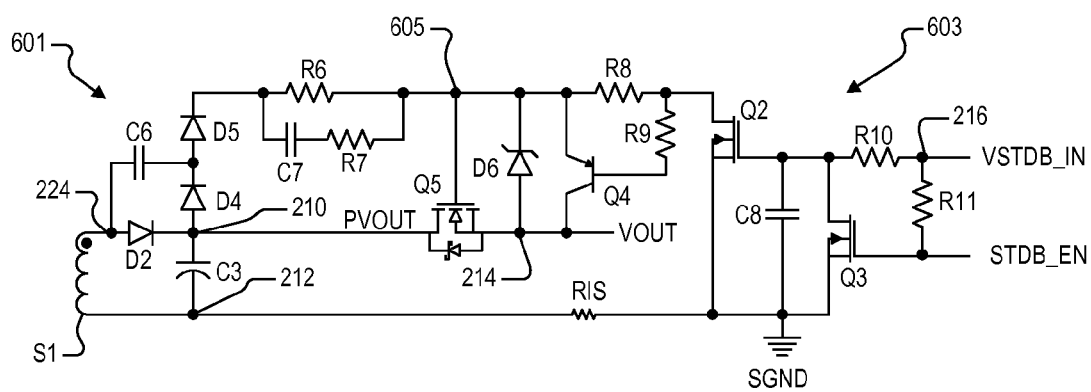
FIG. 6 is a simplified yet more detailed schematic diagram of the secondary portion of the transformer T1 and the power switch of FIG. 2.

FIG. 6 is a simplified yet more detailed schematic diagram of the secondary portion of the transformer T1 and the power switch 207. The secondary portion includes a the main output switch Q5, a charge system 601 and a switch control system 603. The charge system 601 includes capacitors C6 and C7, diodes D4 and D5, Zener diode D6, and resistors R6 and R7. The switch control system 603 includes MOSFET switches Q2 and Q3, PNP BJT Q4, capacitor C8, and resistors R8, R9, R10 and R11. The secondary winding S1 is shown coupled to between node 224 and 212 as previously described. Node 224 is coupled to one end of C6 having its other end coupled to the cathode of D4 and to the anode of D5. The anode of D4 is coupled to node 210 and the cathode of D5 is coupled to one end of R6 and to one end of C7. The other end of C7 is coupled to one end of R7. The other ends of R6 and R7 are coupled together at a node 605, which is further coupled to the gate of Q5, to the cathode of D6, to the emitter of Q4, and to one end of R8. The drain of Q5 is coupled to node 210 and its source is coupled to the output node 214 developing VOUT. The anode of D6 and the collector of Q4 are also coupled to output node 214. The other end of R8 is coupled to one end of R9 and to the drain of Q2. The other end of R9 is coupled to the base of Q4. The source of Q2 is coupled to SGND and its gate is coupled to one end of C8, to one end of R10 and to the drain of Q3. The other end of R10 is coupled to node 216 providing VSTDB_IN. The source of Q3 is coupled to SGND and its gate receives the standby enable signal STDB_EN. STDB_EN is also provided to one end of R11, having its other end coupled to node 216. The current sense resistor RIS is shown coupled between node 212 and SGND. Switches Q2 and Q3 are shown as N-channel MOSFETs although other types of electronic switches are contemplated.

In operation, upon power up the converter 219 becomes active to switch current through the transformer T1. As previously described, the converter 219 is configured for flyback mode, so that when Q1 is on, diode D2 is reversed biased and off so that energy is stored in the transformer T1. When Q1 is initially turned on, current flows through capacitor C3 forward biasing diode D4 and charging capacitor C6. When Q1 is off, the voltage on capacitor C6 forward biases D5 providing charge to node 605 to the gate of Q5 and to the cathode of D6. It is noted that the resistor R7 is substantially smaller than the resistor R6, and that initially the capacitor C7 appears as a short circuit. In this manner, the gate of Q5 is quickly charged through resistor R7 during power up to turn it on relatively quickly. Once C7 is charged, R7 is effectively removed and current flows through larger resistor R6. The Zener diode D6 has a threshold voltage level to keep Q5 turned on during normal operation, such as, for example, about 15V. Q5 is turned on quickly at startup once flyback converter regulation is operating to charge main output voltage VOUT and to begin regulation of VOUT during normal operation by the controller 205 as previously described. Q5 is shown as a self-driving N-MOSFET output switch, which is conventionally implemented with a more expensive P-MOSFET output switch. The STDB_EN signal is pulled high turning on switch Q3 during normal operation, where Q3 pulls gate of switch Q2 low turning Q2 off. The base of transistor Q4 is pulled high via resistors R8 and R9, turning Q4 off so that Q5 stays on during normal operation.

When the STDB_EN signal is pulled low to initiate the standby mode of operation, Q3 is turned off, so that the gate of Q2 receives voltage VSTDB_IN to turn on Q2. When Q2 is turned on, it pulls the base of Q4 low turning on Q4. Q4, when turned on, shorts node 605 to 214 to turn off the Zener diode D6 and to pull the gate of Q5 low to its source to turn it off during the standby mode. In this manner, when the STDB_EN signal is pulled low to enter standby mode, Q5 is turned off pulling VOUT low to zero to avoid any residual voltage applied to the main output loads. Q5 remains off during standby mode of operation. If and when STDB_EN is subsequently pulled high, the process is reversed. Thus, when the STDB_EN signal goes high, Q3 turns on, Q2 is turned off, Q4 is turned off, and the voltage develops on node 605 to turn Q5 back on so that VOUT is once again driven by PVOUT to its regulated voltage level.

Figure 7:
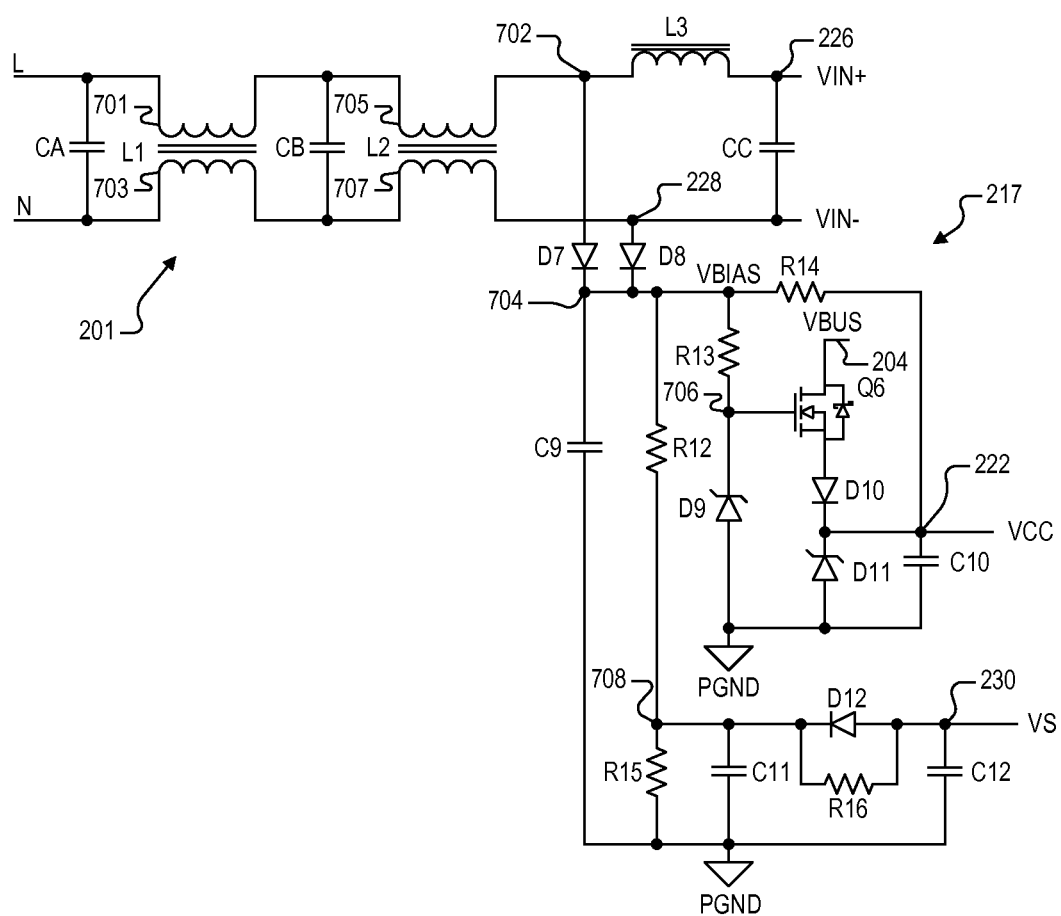
FIG. 7 is a simplified yet more detailed schematic diagram of the input module and the bias and discharge system of FIG. 2 according to one embodiment.

FIG. 7 is a simplified yet more detailed schematic diagram of the input module 201 and the bias and discharge system 217 according to one embodiment. The input module 201 includes a pair of common mode inductors L1 and L2, the three input differential filter capacitors CA, CB and CC and a series inductor L3, which collectively form an AC input system receiving and filtering the AC line voltage. The line L signal is provided to one end of capacitor CA and to one end of a first winding 701 of the inductor L1. The other end of the first winding 701 is coupled to one end of capacitor CB and to one end of a first winding 705 of the inductor L2. The other end of the first winding 705 of the inductor L2 is coupled to a node 702, which is coupled to one end of L3. The other end of L3 is coupled to node 226 which develops the VIN+ voltage. Node 226 is coupled to one end of capacitor CC and to the positive input of the full wave rectifier 203 (FIG. 2). The neutral signal N is provided to the other end of capacitor CA and to one end of a second winding 703 of the inductor L1. The other end of the second winding 703 is coupled to the other end of capacitor CB and to one end of a second winding 707 of the inductor L2. The other end of the second winding 707 of the inductor L2 is coupled to node 228 which develops the VIN− voltage provided to the other end of capacitor CC and to the negative input of the full wave rectifier 203. It is appreciated that when the AC line voltage is applied, the capacitors CA-CC may be charged to relatively high voltage levels.

The bias and discharge system 217 includes diodes D7, D8, D10 and D12, Zener diodes D9 and D11, capacitors C9, C10, C11 and C12, resistors R12, R13, R14, R15 and R16, and a switch Q6. In one embodiment the switch Q6 is an N-type MOSFET although other types of electronic switches are contemplated. Each of the resistors and capacitors may be implemented with multiple devices in series and/or in parallel as understood by those skilled in the art. As shown, the anode of D7 is coupled to node 702 and the anode of D8 is coupled to node 228 for receiving VIN−. The cathodes of D7 and D8 are coupled together at a node 704 developing a DC voltage VBIAS, which is further coupled to one end of each of C9, R12, R13 and R14. The other end of C9 is coupled to PGND, the other end of R12 is coupled to an input voltage sense node 708, the other end of R13 is coupled to a node 706, and the other end of R14 is coupled to node 222 providing VCC. D9 has its anode coupled to PGND and its cathode coupled to node 706. Q6 has its drain coupled to node 204 receiving VBUS, its gate coupled to node 706, and its source coupled to the anode of D10. The cathodes of D10 and D11 are coupled together at node 222. The anode of D11 is coupled to PGND and C10 is coupled between node 222 and PGND. Resistor R15 and capacitor C11 are coupled in parallel between node 708 and PGND. D12 has its anode coupled to node 230 and its cathode coupled to node 708. R16 is coupled between nodes 708 and 230. C12 is coupled between node 230 and PGND.

Upon power up with application of the AC line voltage charging VIN+/−, the rectifier system including diodes D7 and D8 cooperate with the full wave rectifier 203 to rectify VIN+/− and develop the DC voltage VBIAS, which is further filtered by C9. The capacitor C10 begins to be charged from VBIAS via R14. The gate of Q6 is charged to the threshold voltage level of D9 and VBUS rises so that Q6 is turned on. VCC is initially charged to a voltage about equal to the threshold voltage of D9 less the gate-to-source voltage (VGS) of Q6 less the voltage drop of D10. Thus the circuit and devices of Q6 form a start-up regulator system for initially providing VCC supply voltage to the controller 205. In one embodiment, the threshold voltage of D9 is about 13V and the initial voltage of VCC is about 10V. The threshold voltage of D11 is above the initial value of VCC so that it is off. In one embodiment, the threshold voltage of D11 is about 18V, where D11 operates as a protection diode. The initial voltage of VCC is sufficient to power up the controller 205, which turns on and begins controlling switching of Q1 for activating the converter 219. As previously described, the primary winding P2 begins providing current to charge C2 to the operating voltage level of VCC. The operating voltage of VCC is greater than its initial value developed by the bias and discharge system 217. In one embodiment, the operative voltage level of VCC is about 12V. When VCC rises to its operating voltage level, Q6 is turned off since VGS of Q6 is reduced to below its threshold level. The resistances of R12, R13 and R14 are sufficiently high to draw relatively little current during normal and standby modes of operation of the electronic device 100, and Q6 is turned off so that the bias and discharge system 217 consumes negligible power during normal operation and during standby mode.

R15 has a relatively small resistance compared with R12, and R12 and R15 collectively form a voltage divider for developing a voltage on node 708 proportional to the voltage level of DC voltage VBIAS. The sense voltage is filtered by C11 and sensed by the controller 205 via R16 and node 230. D12 and R16 collectively operate as a timing system to delay the charging of C12 upon start-up which delays turn-on activation of the controller 205. As previously described, the controller 205 senses the voltage level of the VCC and VS voltages and initiates normal operation when these voltages have reached corresponding minimum voltage levels.

Safety requirements dictate that the input differential filter capacitors CA, CB and CC be quickly discharged upon removal of AC line voltage. For example, when the AC plug 101 is disconnected from AC voltage, the capacitors CA, CB and CC are discharged within one second to meet the safety requirements. In conventional configurations, bleeding resistors are provided in parallel with the differential filter capacitors to perform the discharge function. Such input bleeding resistors, however, consume substantial power during normal operation and would otherwise increase power consumption during the standby mode. Conventional power supplies often include a bias circuit for providing the VCC and/or VS voltages and the like, where such conventional configurations are sourced by the bus voltage, such as VBUS. The capacitor C1, however, is a rather large bulk capacitor which discharges relatively slowly so that a conventional bias circuit is unable to discharge the input differential filter capacitors within desired time limits.

The bias and discharge system 217, however, performs one or more bias voltage functions and further provides multiple discharge paths via the rectifiers D7 and D8 to discharge these input differential capacitors and to discharge the capacitors C9 and C10 within the desired time limits. A first path is through resistor R12 and R15 to PGND. A second path is through resistor R13 and Zener diode D9 to PGND. A third path is through resistor R14 and Zener diode D11 to ground. A fourth path is through resistor R14 and the VCC input of the controller 205, which may be modeled as another resistor. Thus, the fourth path is another resistive path to PGND. These multiple paths provide sufficient discharge capability to discharge the capacitors CA, CB and CC within the specified amount of time (e.g., within 1 second) after removal of AC line voltage. When AC line voltage is removed, C11 is discharged quickly through R15, and C12 is discharged quickly through R16 and R15 and through D12 and R15. Both of these capacitors C11 and C12 are discharged within one second. Thus, conventional bleeding resistors are eliminated to improve efficiency and to minimize standby power consumption. In one embodiment, R12 and R13 are each about 2 mega-ohm (MΩ), R14 is about 1 MΩ, and R15 has a relatively small resistance (e.g., about 35 kΩ).

A power supply according to one embodiment includes a converter, a capacitance, and a hiccup control module. The converter has an active state and an inactive state, where the converter converts an input voltage to both an output voltage and a preliminary standby voltage when in its active state. The capacitance charges the preliminary standby voltage to an upper voltage level when the converter is in its active state and discharges the preliminary standby voltage at a selected discharge rate down to a lower voltage level when the converter is in its inactive state. The hiccup control module receives a standby enable indicating one of normal mode and standby mode of the power supply. During the standby mode, the hiccup control module operates the converter in hiccup mode by toggling between placing the converter into its inactive state when the preliminary standby voltage charges to the upper voltage level and placing the converter into its active state when the preliminary standby voltage discharges to the lower voltage level.

The normal mode of the power supply is for online operation and the standby mode is for offline operation. The converter includes a first feedback path for regulating the output voltage during the normal mode and a second feedback path for regulating the preliminary standby voltage between the lower and upper voltage levels during the standby mode. In one embodiment, both feedback paths are isolated.

An electronic device according to one embodiment includes main device system, a converter, a capacitance, and a hiccup control module. The main device system receives a source voltage and a regulated standby voltage. The main device system includes a mode control module receiving the standby voltage and has an output providing a standby control signal indicating one of a normal mode and a standby mode of the electronic device. The converter converts an input DC voltage to the source voltage and a preliminary standby voltage when in its active state during the normal mode of the electronic device. The capacitance charges the preliminary standby voltage to an upper voltage level when the converter is in its active state and discharges the preliminary standby voltage down to a lower voltage level when the converter is in its inactive state. During the standby mode, the hiccup control module operates the converter in hiccup mode by switching between placing the converter into its inactive state when the preliminary standby voltage charges to the upper voltage level and placing the converter into its active state when the preliminary standby voltage discharges to the lower voltage level.

A method of operating a power supply with hiccup standby operation according to one embodiment includes operating a converter in a normal mode of the power supply to convert an input voltage to an output voltage and a preliminary standby voltage. The preliminary standby voltage is charged to an upper voltage level during the normal mode of operation. The method includes detecting an indication of a standby mode of the power supply, and when in the standby mode, operating the converter in hiccup mode. During the hiccup mode, the method includes deactivating the converter when the preliminary standby voltage is charged to the upper voltage level, discharging the preliminary standby voltage at a selected rate to a lower voltage level while the converter is deactivated, and reactivating the converter to recharge the preliminary standby voltage to the upper voltage level when the preliminary standby voltage has discharged to the lower voltage level.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A power supply, comprising:
   a converter having an active state and an inactive state, wherein said converter converts an input voltage to an output voltage and a preliminary standby voltage when in said active state;
   a capacitance which stores said preliminary standby voltage, wherein said capacitance is charged to an upper voltage level when said converter is in said active state and is discharged at a selected discharge rate down to a lower voltage level when said converter is in said inactive state; and
   a hiccup control module which receives a standby enable signal indicating one of normal mode and standby mode of the power supply, wherein during said standby mode, said hiccup control module operates said converter in a hiccup mode by toggling between placing said converter into said inactive state when said preliminary standby voltage is charged to said upper voltage level and placing said converter into said active state when said preliminary standby voltage is discharged to said lower voltage level.

2. The power supply of claim 1, further comprising a low dropout regulator which converts said preliminary standby voltage to a regulated standby voltage.

3. The power supply of claim 1, wherein:
   said converter comprises a controller having a mode input for switching said controller between said active state and said inactive state; and
   wherein said hiccup control module has a first input receiving said standby enable signal, having a second input receiving and said preliminary standby voltage, and having an output providing a mode signal to said mode input of said controller.

4. The power supply of claim 3, wherein said hiccup control module comprises an optical coupler having a first input receiving said preliminary standby voltage, having a second input receiving said standby enable signal, having a first output coupled to a supply voltage, and having a second output providing said mode signal to said mode input of said controller.

5. The power supply of claim 3, further comprising:
   a regulator which converts said preliminary standby voltage to a regulated standby voltage; and
   wherein said hiccup control module comprises:
      a resistance having a first end receiving said preliminary standby voltage and having a second end;
      a transistor having a first current terminal coupled to said second end of said resistance, having a second current terminal, and having a control terminal receiving said regulated standby voltage; and
      an optical coupler having an internal LED having an anode coupled to said second current terminal of said transistor and a cathode receiving said standby enable signal, and having an internal transistor having a first current terminal coupled to a supply voltage and a second current terminal providing said mode signal.

6. The power supply of claim 1, further comprising:
   said converter including an output system which develops a preliminary output voltage during a normal operating mode of the power supply; and
   an output switch controlled by said standby enable signal, wherein said output switch asserts said preliminary output voltage as said output voltage when said standby enable signal indicates said normal mode and wherein said output switch disables said output voltage when said standby enable signal indicates said standby mode.

7. The power supply of claim 6, wherein said output switch comprises an N-channel MOSFET.

8. The power supply of claim 6, wherein said output switch comprises:
   a charge system coupled to said output system which charges a gate node to a voltage level above said preliminary output voltage during said normal mode;
   a transistor having a control terminal coupled to said gate node, a first current terminal receiving said preliminary output voltage and a second current terminal coupled to an output node which develops said output voltage; and
   a switch control system having an input receiving said standby enable signal, wherein said switch control system shorts said gate node to said output node to turn off said transistor when said standby enable signal indicates said standby mode.

9. The power supply of claim 1, wherein said converter has a first feedback path for regulating said output voltage during said normal mode and a second feedback path for regulating said preliminary standby voltage during said standby mode.

10. An electronic device, comprising:
   main device system receiving a source voltage and a regulated standby voltage, wherein said main device system includes a mode control module receiving said standby voltage and having an output providing a standby control signal indicating one of a normal mode and a standby mode of the electronic device;
   a converter having an active state and an inactive state, wherein said converter converts an input DC voltage to both said source voltage and a preliminary standby voltage when in said active state, wherein said converter remains in said active state during said normal mode;
   a capacitance which stores said preliminary standby voltage, wherein said capacitance is charged to an upper voltage level when said converter is in said active state and is discharged down to a lower voltage level when said converter is in said inactive state; and
   a hiccup control module which receives said standby control signal, wherein during said standby mode said hiccup control module operates said converter in a hiccup mode by switching between placing said converter into said inactive state when said preliminary standby voltage is charged to said upper voltage level and placing said converter into said active state when said preliminary standby voltage is discharged to said lower voltage level.

11. The electronic device of claim 10, further comprising:
   an AC input system receiving an AC line voltage; and
   an AC/DC converter which converts said AC line voltage to said DC input voltage.

12. The electronic device of claim 10, wherein:
   said converter comprises a controller having a mode input for switching said controller between said active state and said inactive state; and
   wherein said hiccup control module has a first input receiving said standby control signal, having a second input receiving and said preliminary standby voltage, and having an output providing a mode signal to said mode input of said controller.

13. The electronic device of claim 12, wherein said controller is in said active state when said mode input is at a first level and is in said inactive state when said mode input in at a second level, wherein said hiccup control module asserts said mode signal to said first level when said standby control signal indicates normal mode, wherein said hiccup control module asserts said mode signal to said first level when said standby control signal indicates standby mode and said preliminary standby voltage is at said lower voltage level, and wherein said hiccup control module asserts said mode signal to said second level when said standby control signal indicates standby mode and said preliminary standby voltage is at said upper voltage level.

14. The electronic device of claim 12, further comprising:
   a regulator which converts said preliminary standby voltage to said regulated standby voltage during both said normal mode and said standby mode; and
   wherein said hiccup control module comprises:
      a resistance having a first end receiving said preliminary standby voltage and having a second end;
      a transistor having a first current terminal coupled to said second end of said resistance, having a second current terminal, and having a control terminal receiving said regulated standby voltage; and
      an optical coupler having an internal LED having an anode coupled to said second current terminal of said transistor and a cathode receiving said standby control signal, and having an internal transistor having a first current terminal coupled to a supply voltage and a second current terminal providing said mode signal.

15. The electronic device of claim 10, further comprising:
   an output system coupled to said converter which develops a preliminary source voltage during said normal mode; and
   an output switch controlled by said standby control signal, wherein said output switch asserts said preliminary source voltage as said source voltage when said standby control signal indicates said normal mode, and wherein said output switch disables said source voltage when said standby control signal indicates said standby mode.

16. The electronic device of claim 15, wherein said output switch comprises:
   a charge system coupled to said output system which charges a gate node to a voltage level above said preliminary source voltage during said normal mode;
   a transistor having a control terminal coupled to said gate node, a first current terminal receiving said preliminary source voltage and a second current terminal coupled to a source node developing said source voltage; and
   a switch control system having an input receiving said standby control signal, wherein said switch control system shorts said gate node to said source node to turn off said transistor when said standby control signal indicates said standby mode.

17. The electronic device of claim 10, wherein the electronic device consumes less than 0.5 Watts during said standby mode.

18. A method of operating a power supply with hiccup standby operation, comprising:
   operating a converter in a normal mode of the power supply to convert an input voltage to an output voltage and a preliminary standby voltage, wherein the preliminary standby voltage is charged to an upper voltage level;
   detecting an indication of a standby mode of the power supply; and
   when in the standby mode, operating the converter in a hiccup mode which comprises:
      deactivating the converter when the preliminary standby voltage is charged to the upper voltage level;
      discharging the preliminary standby voltage at a selected rate to a lower voltage level while the converter is deactivated; and
      reactivating the converter to recharge the preliminary standby voltage to the upper voltage level when the preliminary standby voltage has discharged to the lower voltage level.

19. The method of claim 18, further comprising:
   converting the preliminary standby voltage to a regulated standby voltage; and
   providing the regulated standby voltage to a mode control module which provides a standby control signal indicating one of the normal mode and the standby mode.

20. The method of claim 18, further comprising:
   when in the standby mode, turning on a transistor when the preliminary standby voltage is charged to the upper voltage level and turning off the transistor when the preliminary standby voltage has discharged to the lower voltage level;

when the transistor is turned on, asserting a mode signal to a first level to deactivate the converter; and when the transistor is turned off, asserting the mode signal to a second level to reactivate the converter.

21. The method of claim 18, further comprising turning on an N-channel device to enable the output voltage during the normal mode and turning off the N-channel device to disable the output voltage during the standby mode.

* * * * *